UNITED STATES PATENT OFFICE.

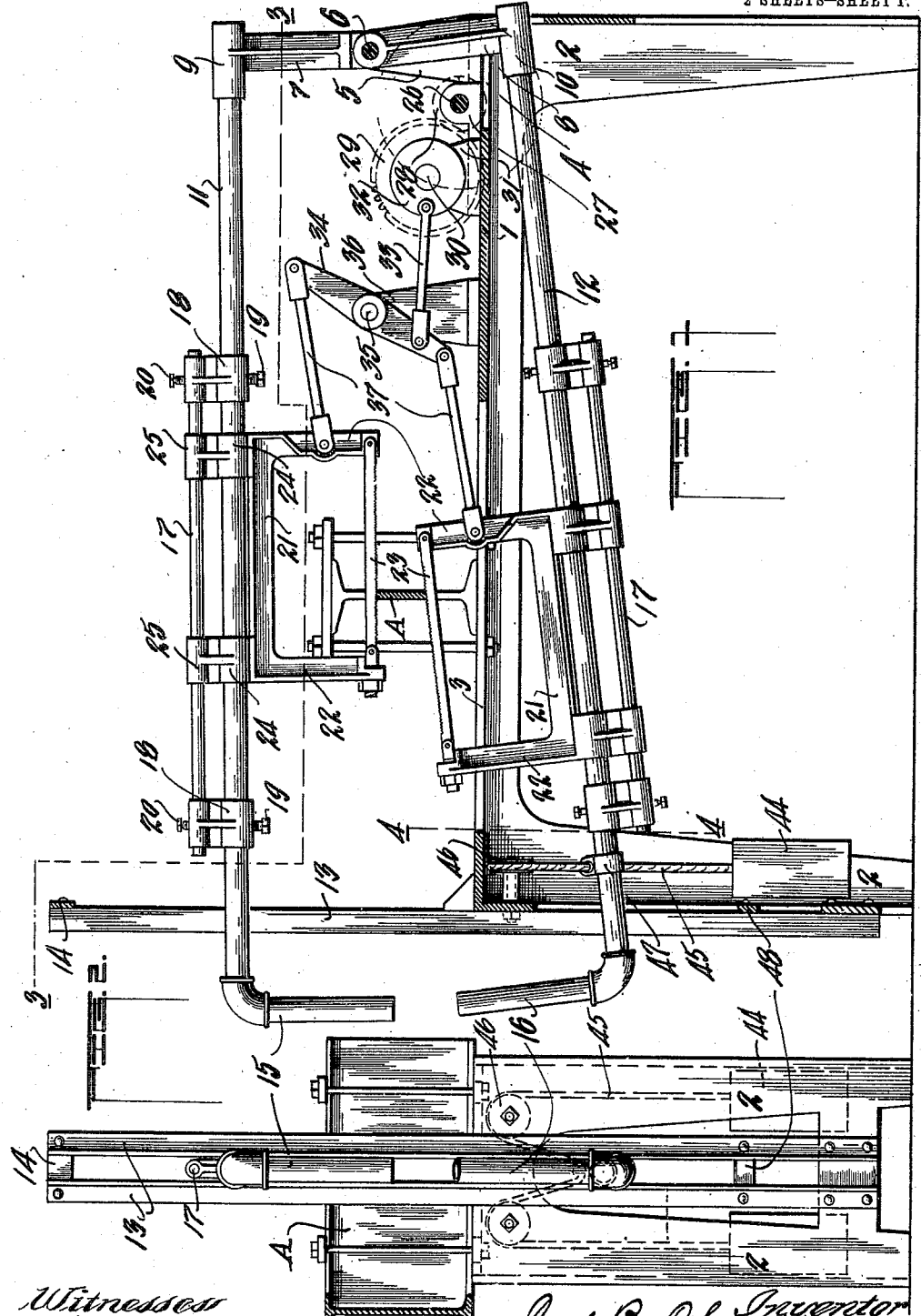

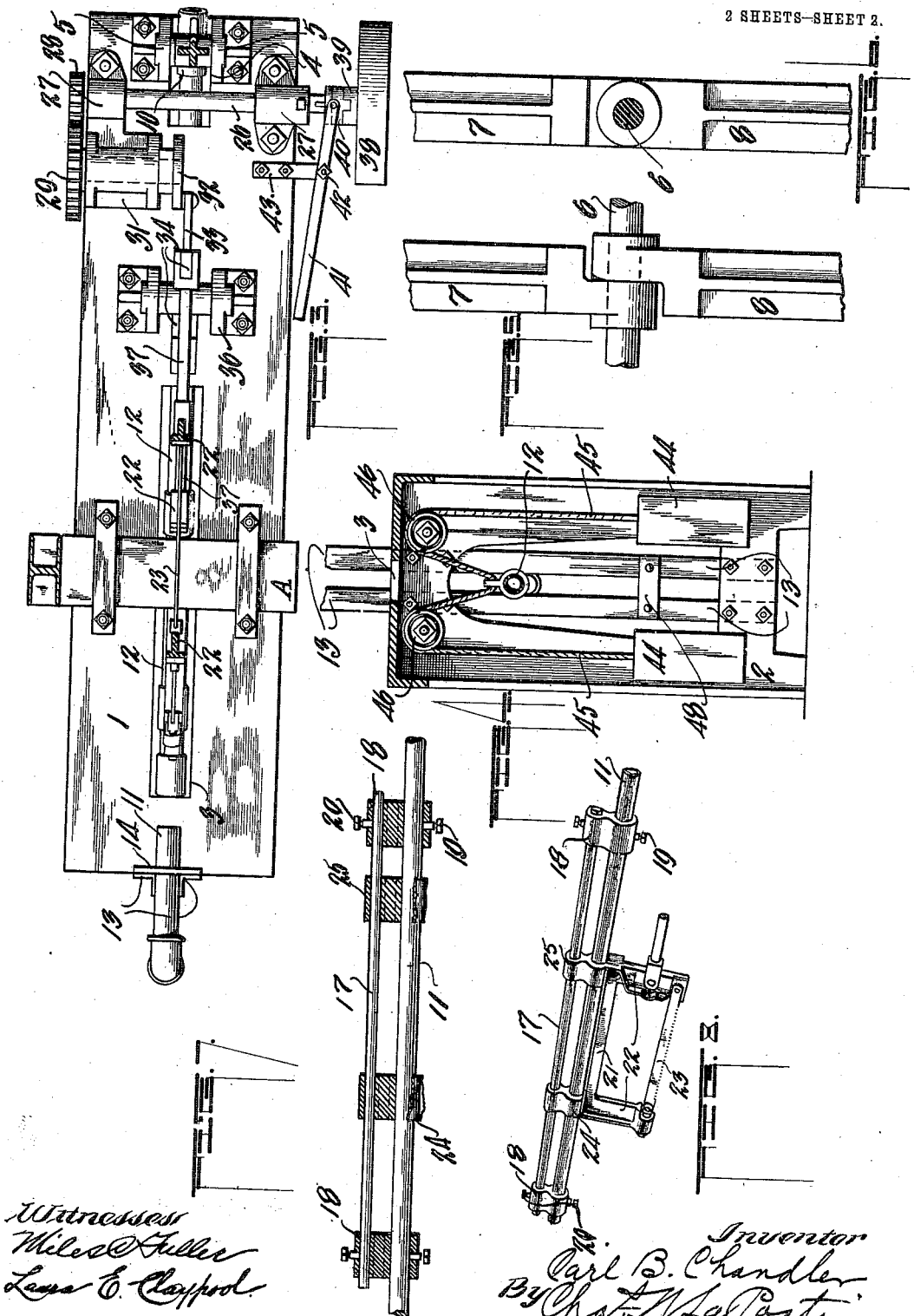

CARL B. CHANDLER, OF CANTON, ILLINOIS, ASSIGNOR TO SAMUEL SAVILL, OF CANTON, ILLINOIS.

HACKSAW.

982,937.      Specification of Letters Patent.      Patented Jan. 31, 1911.

Application filed February 25, 1909. Serial No. 479,999.

*To all whom it may concern:*

Be it known that I, CARL B. CHANDLER, a citizen of the United States, residing at Canton, in the county of Fulton and State of Illinois, have invented certain new and useful Improvements in Hacksaws; and I do hereby declare that the following is a full, clear, and exact description of the invention, which will enable others skilled in the art to which it appertains to make and use the same.

This invention has reference to certain new and useful improvements in hack-saws and has for its object to construct a machine of this type, with a plurality of saw blades arranged to be operated in unison and adapted to cut through a piece of material from opposite sides.

A further object of the invention is to construct a hack-saw with superimposed saw blades connected with suitable operating means whereby when one of the saws is moving in one direction cutting, the other saw is moving in an opposite direction, or on its back stroke.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a side elevation of my improved machine, with parts thereof in longitudinal cross-section; Fig. 2 is an end elevation of the machine as the same would appear looking at the left hand of said machine; Fig. 3 is a sectional plan view of the machine as the same would appear on the line 3—3 of Fig. 1; Fig. 4 is a cross section, as the machine would appear on the line 4—4 of Fig. 1, Fig. 5 is a front elevation of portions of hinged arms which support rods carrying the saw frames; Fig. 6 is a side elevation of parts seen in Fig. 5; Fig. 7 is a detail view, showing the saw frame supporting rods, with parts in section, and Fig. 8 is a perspective view of one of the saw-frames and supporting rods therefor.

Like numerals of reference indicate corresponding parts throughout the figures.

The bed of the machine is preferably a table 1 supported on legs 2, the table portion thereof longitudinally slotted as at 3 and 4. On one end of the table are mounted standards 5 forming a bearing for a shaft 6, and said shaft carries the upper and lower pivoted arms 7 and 8, formed at their outer ends with tubular bearings 9 and 10 in which are secured one end of upper and lower longitudinally disposed rods 11 and 12 which extend to the opposite end of the machine and pass through or between the uprights 13 suitably spaced apart to form a guide for the free ends of said rods 11 and 12, and said uprights are fastened at their lower ends to the leg 2 of the machine and at their upper ends united by the cross piece 14. The free ends of the rods 11 and 12 have suitably connected therewith the rods 15 and 16 which extend toward each other and at right angles to the rods 11 and 12 with which they are connected, for purposes which will be explained.

To each rod 11 and 12 is connected a rod 17, said rod extending parallel with its respective rod 11 or 12, for a suitable distance and secured thereto and held spaced therefrom by means of clamping blocks 18, which may be secured to the rods 11 and 12 by set screws 19, and similar set screws 20 are employed for securing the rods 17 in said blocks 18, as shown.

21 denotes saw-blade frames having the bifurcated arm extensions 22 to which the opposite ends of saw-blades 23 may be connected, and said frames are provided with tubular bearings 24 and 25 which are carried upon and have a slidable relation on the respective rods 11 and 17, and 12 and 17, as shown in Figs. 1, 7 and 8.

The operating means for said saw-blade frame 21, comprises a driving shaft 26 extending transversely across the table 1 and journaled in boxings 27. On one end of said shaft is carried a gear wheel 28, in mesh with a gear wheel 29 on a shaft 30 journaled in the support 31 on the bed 1, and said shaft 30 carries a disk 32 to which is eccentrically attached a connecting rod 33 and said rod 33 is in turn attached to a walking-beam 34 fulcrumed at 35 to a support 36 on the table 1, and to the upper and lower ends of said walking-beam 34 are attached connecting rods 37 which are in turn attached to arm extensions 22 of the upper and lower saw-blade frames 21, as shown in Fig. 1. Thus it will be seen that as the walking-beam 34 is oscillated, the frames 21 will be reciprocated in opposite directions on their supporting rods 11 and 17, and 12 and 17 respectively, the arrangement of the supporting rods, as shown, retaining the saw-blades 23 at all times parallel with such supporting rods, and when one saw-blade 23 is moving forwardly cutting the material, the other of said blades 23 is being returned. The shaft 26 may be operated from any suitable source of power and by any suitable driving means, but I have shown the shaft 26 provided with a pulley 38 having a clutch face 39 with which will engage a clutch 40 for connecting the pulley 38 to the shaft 26 and operatively connected with the clutch 40 is a lever 41, fulcrumed at 42 to an arm 43 secured to the table 1, see Fig. 3, and it is intended that the pulley 38 may be connected by a belt, not shown, with some suitable motive power, not shown.

The longitudinal slot 3 in the table 1 provides for passing the lower saw-blade frame 21 therethrough and for operating the same in said slot, while the slot 4 allows for the necessary forward swing of the arm 8 and the rod 12 as said rod 12 is elevated to be brought into contact with the material which the lower blade 23 is intended to operate on.

The weight of the upper rods 11, 15 and 17, saw-frame 21 and connections, is sufficient to insure the upper saw-blade 23 maintaining its cutting position relative to the material it is operating upon and to hold the lower blade 23 to its work, I provide the weights 44, suspended by the rope 45 which passes up and over sheave wheels 46 and through a guide 47 on the rod 12, see Figs. 1 and 4. I prefer to locate the weights 44 at the extreme end of the machine, not only for the purpose of partially concealing the weights and obtaining a greater leverage on the bar 12, but also to locate them where they will be out of the way.

For convenience in showing the operation of the blades 23 on a piece of material, I have shown an I beam, referred to as A, clamped in a suitable manner to the table 1 and the blades in the act of sawing through said beam. It will be understood that if necessary, a supplemental support may be provided to be attached or supported on the table 1 to hold the material to be sawed. As the frames 21 approach each other and before the said frames or blades can come into contact with each other, the ends of rods 15 and 16 will engage, the upper rod causing the lower rod to back out and the upper blade finish the cut, if necessary.

As a means of support for the outer ends of the rods 11 and 12, I provide a member 48 attached to the legs 2, upon which the said parts may rest when the machine is empty; the said stop member being so placed to insure proper clearance of sawing blades when a piece of metal is inserted in the machine preparatory to being sawed.

I anticipate, of course, that an automatic cut-out mechanism may be provided to throw out the driving mechanism when the cut is finished, but as such devices are well known, it has not been thought necessary to show the same; also, that means may be provided, such as a latch, for holding one of the blades inoperative, while the other is working.

Having thus fully described my invention, what I claim and desire to secure by Letters Patent of the United States, is:—

1. In a machine of the character described, the combination of a pair of superimposed saw frames, blades attached thereto, a pivoted support for each frame, means on said supports adapted to engage for preventing the engagement of said frames and blades, and mechanism for reciprocating said frames.

2. In a machine of the character described, the combination of a pair of superimposed saw frames, blades attached to said frames, pivoted supports on which said frames are reciprocally mounted, means for holding said lower support and frame thereon against the work operated on by the blade of said frame, means on said supports adapted to engage for preventing the engagement of said frames and blades, and mechanism for reciprocating said frames.

3. In a machine of the character described, the combination of a pair of superimposed supports pivoted at one end, guides for the free ends of said supports, saw frames reciprocally mounted on said supports, blades attached to said frames, mechanism for reciprocating said frames, and means on said supports adapted to engage as said frames approach each other for preventing the blades and frames from engaging.

4. In a machine of the character described, the combination of a table, arms pivotally attached to a common support on said table, supporting rods secured at one end to said arms, guides for the free ends of said rods, saw frames reciprocally and oppositely mounted on said rods, blades attached to said frames, power devices mounted on said table, a disk operatively connected with said power devices, a walking beam, a rod connected with said beam and eccentrically connected with said disk, and connections between said beam and said frames.

5. In an apparatus of the character described, in combination, upper and lower pivoted supports, saw frames movable on said supports, supplemental guides for the frames on the supports, means for automatically lifting and holding the lower support and frame in operative relation with its work, and operating means for the frames, said operating means so arranged that the frames are moved simultaneously in opposite directions.

6. In an apparatus of the character described, in combination, a bed frame, a shaft mounted transversely at one end of said frame, upper and lower longitudinal supports having a pivotal relation at one end with said shaft and free at their opposite ends, a guide for the free ends of the supports, saw frames having a reciprocable relation with said supports, and means for actuating said saw frames.

7. In an apparatus of the character described, in combination, a bed frame, a shaft mounted on said frame, upper and lower supports having a pivotal relation at one end with said shaft and free at their opposite ends, guides for the free ends of the supports, engaging means on the free ends of the supports, saw frames reciprocably mounted on said supports, and means for actuating said frames.

In testimony whereof I affix my signature in presence of two witnesses.

CARL B. CHANDLER.

Witnesses:
 GEO. W. LANE,
 H. M. BARRON.